INVENTOR.
J. NAGUMO
BY
Roy C. Hopgood
ATTORNEY 3,173,026
ACTIVE PULSE TRANSMISSION LINE

Jin-ichi Nagumo, 68 Shirogane Sarumachi,
Shiba Minatoku, Tokyo, Japan

Filed Feb. 8, 1962, Ser. No. 171,954
Claims priority, application Japan, Feb. 20, 1961,
36/5,474
7 Claims. (Cl. 307—88.5)

This invention relates in general to an active pulse transmission line and more particularly to a pulse transmission line which utilizes negative resistance elements to amplify and to shape pulses transmitted therealong. The invention can be used in any pulse transmission system, but it is particularly useful in microelectronic transmission systems.

Figure 1:
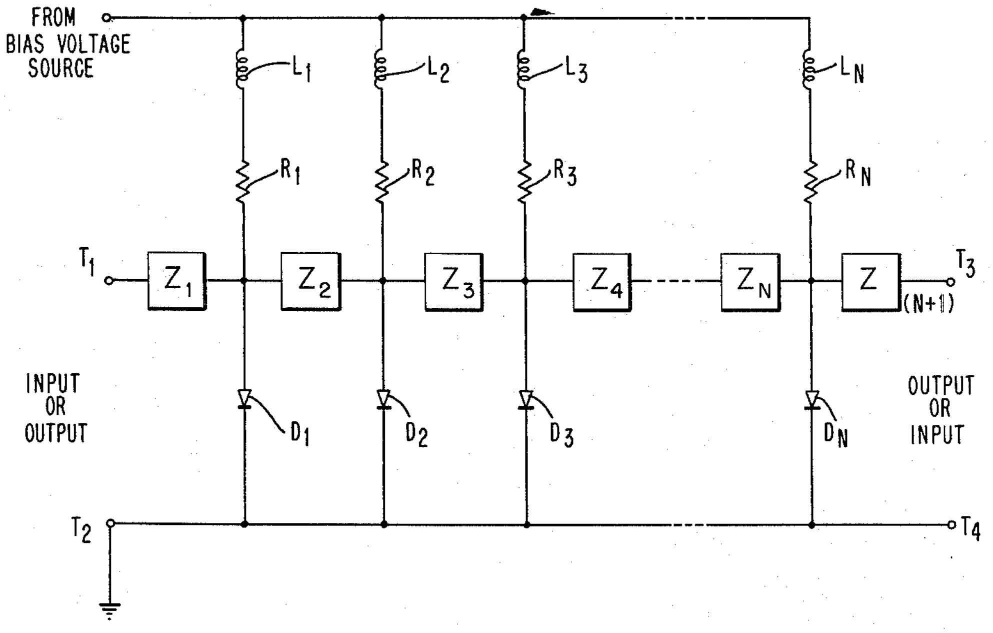
Figure 2:
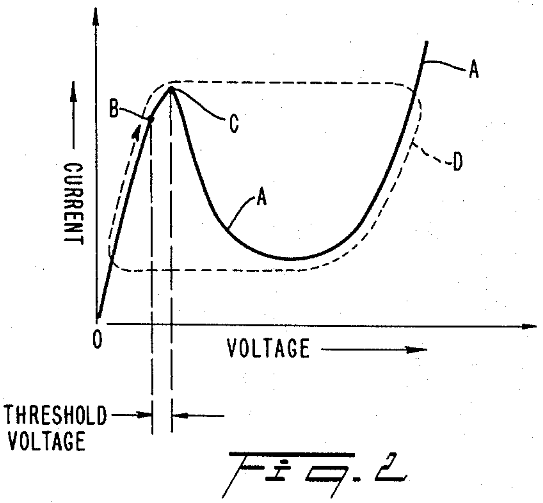

When pulses are transmitted down a conventional transmission line, they suffer attenuation due to dissipation of energy in the line and distortion due to non-linearities in the frequency response to the transmission line. In accordance with this invention, however, this attenuation and distortion is overcome by coupling negative resistance elements to the transmission line at suitable intervals to supply energy to the transmission line and to shape the pulses transmitted therealong. The transmission line of this invention is adapted to amplify pulses which are lower than a predetermined amplitude, to attenuate pulses which are gerater than the predetermined amplitude, to stretch pulses which are narrower than a predetermined width, and to shrink pulses which are wider than the predetermined width. In other words, the transmission line of this invention produces a pulse of predetermined width and predetermined amplitude without any significant attenuation or distortion thereof. In addition, the transmission line of this invention provides a threshold action by which any input pulse noise below a predetermined threshold value is not amplified and shaped for transmission. The means by which these ends are attained will be more clearly understood by the following description of one specific embodiment of the invention, as illutsrated in the attached drawings, in which:

FIG. 1 is a partial schematic circuit diagram of one embodiment of the invention; and FIG. 2 is a characteristic curve for the negative reisstance elements used in the embodiment of FIG. 1.

As shown in FIG. 1, one specific embodiment of this invention comprises a plurality of tunnel diodes D which are coupled together by means of impedance elements Z, which can comprise resistances or inductances and resistances coupled together in series. Each of the tunnel diodes D is coupled through a corresponding resistor R and inductor L to a bias voltage source which is not shown in the drawings. The resistors R, inductors L, and bias voltage source are adapted to produce a monostable multivibrator action for each of the tunnel diodes, as will be more fully described in connection with the curves of FIG. 2.

FIG. 2 shows the voltage-current characteristic curve A of a typical tunnel diode which can be used in connection with the embodiment of FIG. 1. The resistors R, inductors L, and bias voltage source are selected to initially bias each of the tunnel diodes to point B on the characteristic curve thereof and to provide a load condition in which point B is the only stable operating point for the tunnel diode. The exact values required to produce this result can be easily determined by those skilled in the art in accordance with well known design techniques for monostable tunnel diode circuits. If an input voltage is applied to the tunnel diode, it will have no effect unles it is large enough to move the operating point past the start of the negative resistance region, which is located at point C on curve A. Thus the voltage difference between points B and C constitute the threshold voltage for the circuit. If the input pulse is larger than the threshold voltage, the operating point of the tunnel diode will move through the negative resistance region of the curve, as indicated by the dotted line D, and return to the operating point B, thereby producing an output pulse of predetermined width and amplitude as will be apparent to those skilled in the art. This output pulse will be coupled through the corresponding coupling element Z to trigger the next tunnel diode, whose output pulse triggers the next tunnel diode, and so on down the line. It can be seen, then, that an input pulse applied to one end of the transmission line will produce an output pulse of predetermined width and amplitude on the other end of the transmission line as long as the input pulse exceeds the predetermined threshold value. It should be noted that the transmission line of FIG. 1 is bi-directional, i.e. the input pulse can be applied to either end and the output pulse will appear at the opposite end.

Although this invention has been described in connection with a specific embodiment thereof, it should be understood that the invention is by no means limited to the specific structure disclosed herein, since many modifications can be made therein without departing from the basic teaching of this invention. For example, it is not necessary to use tunnel diodes; any other negative resistance element can be used to form the monostable multivibrator stages of this invention, although the tunnel diode is preferable in microelectronic systems due to its fast switching speed. This and many other modifications will be apparent to those skilled in the art, and this invention includes all modifications falling within the scope of the following claims.

I claim:

1. A pulse transmission line comprising a plurality of negative resistance elements each having two terminals, one terminal of each negative resistance element being coupled to a common conductor in spaced relation therealong to form a sequence of negative resistance elements, a plurality of coupling impedances each coupled between the other terminals of an adjacent pair of negative resistance elements, and bias means coupled to said other terminal of each of said negative resistance elements for biasing each of said negative resistance elements for monostable operation, whereby a pulse applied to either end of said sequence of negative resistance elements is transmitted down said sequence to the other end thereof.

2. The combination defined in claim 1 wherein each of said negative resistance elements is adapted to be triggered by pulses greater than a predetermined threshold value but not by pulses smaller than said predetermined threshold values.

3. The combination defined in claim 2 wherein said bias means and said negative resistance elements are adapted to produce pulses of predetermined width and amplitude when said negative resistance elements are triggered.

4. The combinaiton defined in claim 3, wherein said negative resistance elements comprise tunnel diodes.

5. The combination defined in claim 4, wherein said bias means comprises a plurality of resistors and inductors, each of said resistors being coupled in series with a corresponding inductor to said other terminal of a corresponding tunnel diode, and a base voltage source coupled in parallel to each of said series circuits.

6. In a transmission line, the improvement for passing undistorted and unattenuated pulse energy comprising: a plurality of negative resistance elements interspersed in parallel at predetermined locations along said line; an impedance connected in series with each of said elements;

and potential means connected across each serial impedance and negative resistance element for the biasing thereof; each of said impedances comprising an inductance and resistance in series of a value predetermined to form a monostable circuit with said element responsive to a transmitted pulse of predetermined value to trigger said circuit to an unstable condition.

7. In a transmission line, the improvement for passing undistorted and unattenuated pulse energy comprising: a plurality of negative resistance elements interspersed in parallel at predetermined locations along said line; an impedance connected in series with each of said elements; and potential means connected in parallel across each serial impedance and negative resistance element for the biasing thereof; each of said impedances comprising an inductance and resistance in series of a value predetermined to form a monostable circuit with said element responsive to a transmitted pulse of predetermined value to trigger said circuit to an unstable condition.

References Cited by the Examiner

UNITED STATES PATENTS

| | | | |
|---|---|---|---|
| 2,149,355 | 3/39 | Lundstrom | 307—88.5 X |
| 2,522,402 | 9/50 | Robertson | 307—88.5 X |
| 2,585,571 | 2/52 | Mohr | 307—88.5 X |
| 3,051,846 | 8/62 | Schott | 307—88.5 |
| 3,103,600 | 9/63 | Lewin | 307—88.5 |

OTHER REFERENCES

Adler et al.: Nuclear Instruments and Methods, "100 MC/S Tunnel-Diode Discriminator and Pulse-Shaper," vol. 13, No. 2, September 1961, pp. 197–200.

Hilsenrath: IBM Technical Disclosure Bulletin, vol. 4, No. 7, December 1961.

JOHN W. HUCKERT, *Primary Examiner.*

ARTHUR GAUSS, *Examiner.*